UNITED STATES PATENT OFFICE.

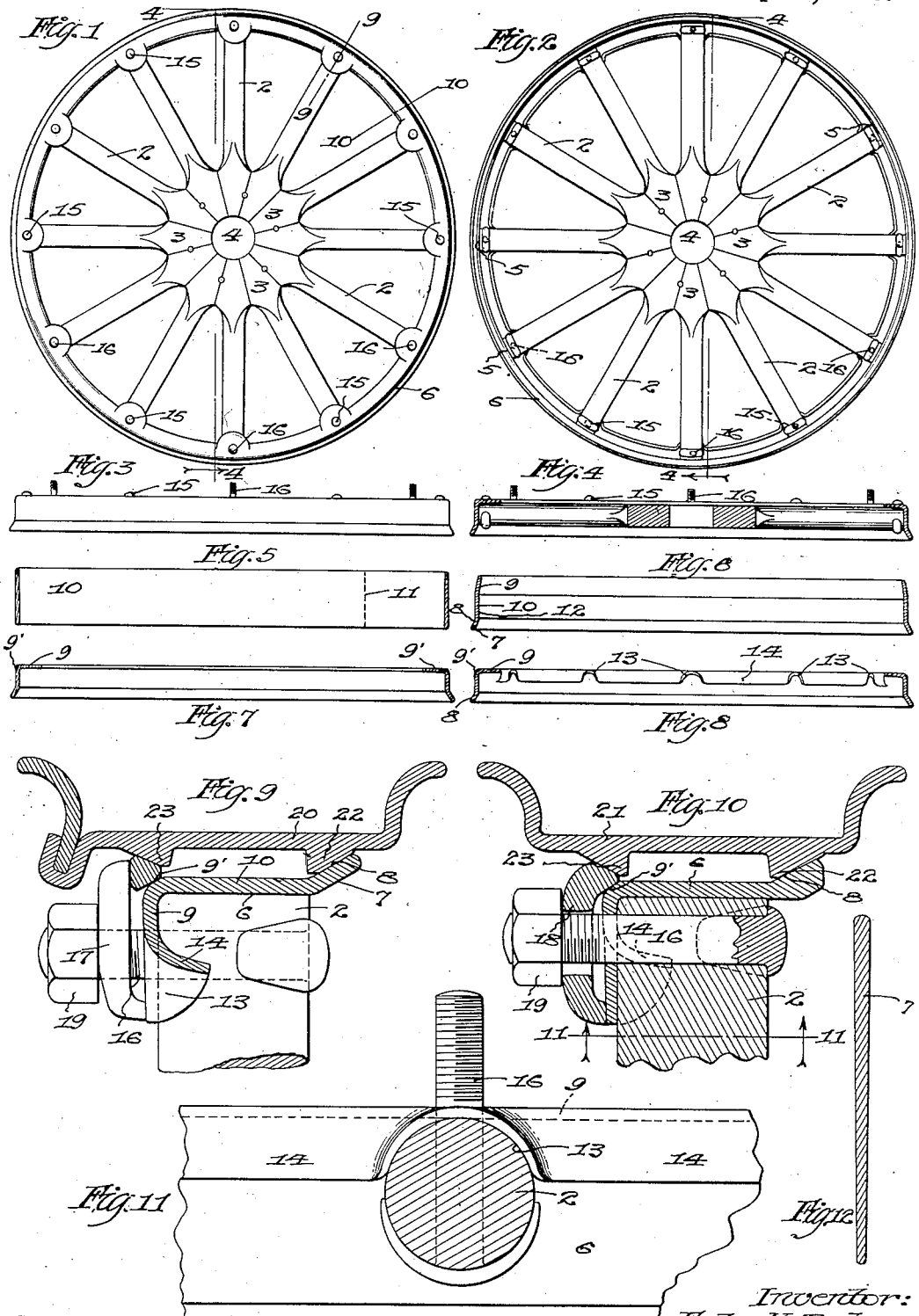

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

MOTOR-VEHICLE WHEEL.

1,336,335.  Specification of Letters Patent.  Patented Apr. 6, 1920.

Application filed November 14, 1918. Serial No. 262,552.

*To all whom it may concern:*

Be it known that I, ERLE K. BAKER, a citizen of the United States, and a resident of Chicago, county of Cook, and State of Illinois, have invented certain new and useful Improvements in Motor-Vehicle Wheels, of which the following is a specification.

The invention relates to improvements in motor vehicle wheels of the kind which carry demountable rims which in turn carry inflated pneumatic tires.

The object of my invention is to simplify the construction of such wheels; to lessen the number of parts therein; to increase the strength thereof; to enhance their resilience; to increase their durability; to render them immune to climatic conditions and changes; to lessen the weight of such wheels, and to materially reduce the cost thereof, and the time and labor required for their manufacture.

My invention resides in a wheel wherein these objects are attained, and the construction, functions, and merits of which will be understood from the accompanying drawings and the following description.

In said drawings, Figure 1 is an outer side view of my improved wheel in a form adapted to receive a demountable rim;—Fig. 2 is an inner side view thereof;—Fig. 3 is a plan view;—Fig. 4 is a section on any line 4—4 of the preceding figures;—Figs. 5, 6, 7, and 8 are sectional views of the metal fixed rim in the several stages of manufacture; Fig. 9 is an enlarged cross-section through the fixed rim on the line 10—10 of Fig. 1 and showing a Q. D. demountable tire rim thereon; Fig. 10 is a similar section on the line 9—9 of Fig. 1, and showing a transplit demountable rim in place on the wheel; Fig. 11 is a horizontal section on the line 11—11 of Fig. 10, viewed in the direction of the arrow; and Fig. 12 is a cross section of the rolled strip stock from which I prefer to form the peculiar fixed rim of my wheel.

The parts, 2, 2, appearing in the several figures of the drawings, are wooden spokes. These have mitered butts, 3, which together comprise the wooden hub center of the wheel and contain the hub hole, 4. A metal hub (not shown) is used therewith. Each radial wooden spoke terminates in a slightly arched, flat or substantially flat end surface, 5, which preferably is of the full cross section of the spoke; instead of being tenoned, as is usual.

It will at once be noted that my wheel has no wooden felly nor a felly band; and no part which corresponds thereto in relation to the spokes and the rim. Instead I employ a single metal part which constitutes the fixed rim proper to receive the demountable rim and the rim-clamping lugs, and at the same time takes the place of and performs all the useful functions of the old style felly and felly band. This single metal part is supported directly upon the ends of the radial wooden spokes; and therewith completes the wheel. As will be explained, the metal rim part is pressed or shrunk upon the spokes and thus is most firmly bound thereon. The circumferential tension and consequent frictional engagement of the metal rim upon the wooden spokes affords the best part of the strength of engagement between them. Incidentally the metal rim completely seals the end grain of the wooden spokes, serving as the cover or cap for each thereof; which greatly adds to the life of the wheel.

The fixed rim, 6, may be made either of hot-rolled or cold-rolled flat strip steel, but preferably is made of a special rolled section of steel that is tapered in cross-section, as shown in Fig. 12. As a first step toward the manufacture of the wheel, a strip of the stock shown in Fig. 12 is made into a ring, 10, as indicated in Fig. 5, and the ring is closed by welding together its ends, as upon the line, 11. The ring then, approximately of the correct circumference, is placed in a rim-rolling machine (having suitably shaped rolls) and is formed to the shape shown in Fig. 6. In this figure it clearly appears that the thick wedge, 7, of the stock is bent outward to form a narrow, inclined flange, 8, while the thinner part of the stock is bent inward (toward the center or axis) to form a wide flange, 9. Thus the first rolling operation converts the stock ring into the flange portion, 8, the body portion, 10, and the wide flange, 9. In this operation the body portion is so shaped as to leave it with a cylindrical inner periphery, 12, the taper of the stock being thrown to the outer side or outer periphery. The next operation is represented in Fig. 7 and consists in bending or turning the greater part of the flange, 9, radially inward, leaving only a narrow part, 9', in the original inclined or a curved position. Thereafter the partially formed rim is circumferentially stretched or compressed as required to give it the correct circumferential measurement required to fit the demountable rim which it is to carry. Then follows an operation upon the article between suitably designed dies (not shown) which deform the flange, 9, to the shape shown in Fig. 8, to-wit, at intervals which correspond to the spacing of the spoke-ends. The flange, 8, is provided with spoke sockets 13 (more fully shown in Figs. 9, 10 and 11) and with the inwardly turned intermediate portions 14, the latter preferably conforming to the curvature of the body portion, 10, and serving to give the wheel the appearance of having a felly. Finally holes are punched in the face portions of the sockets, 13, for the spoke-fastening rivets and bolts hereinafter mentioned. Thus the fixed rim portion (6) of the wheel is completed and made ready for assembly with the wooden spokes, 2. The operation of assembling the parts of the wheel is as follows: The metal rim is placed upon a press. The wooden spokes of correct length are assembled in correct number and radial relation and temporarily are rigidly held in a single plane (or as a cone if the wheel is to be of the "dished" type). Then the body of spokes as a whole is forcibly pressed into the metal rim, or vice versa. Considerable force must be expended as the action obviously tends to distend the member, 6. As will be clearly apparent, entrance of the spoke ends is facilitated by the beveled inner surfaces of the back flange, 7, and the operation is accompanied without imposing sudden or excessive strains upon either the wooden spokes or the metal rim. At such time care is observed in properly positioning the spokes so that they shall squarely land in respective spoke sockets and be set home against the front flange, 9, from which the sockets are formed. The position of a spoke in its socket is clearly shown in Figs. 9, 10 and 11. It is to be noted that the body portion of the member, 6, is of a width that corresponds to the diameter or thickness of the spoke, 2, and the entire end of the spoke is therefore completely sealed by the metal surface that it abuts. Spoke sockets of various shapes may be formed in the manner described, to fit spokes of different shapes. This being obvious, I have deemed it unnecessary to illustrate other than the round spoke and the correspondingly deformed rim flange.

My usual practice is to positively secure one-half of the spokes to the metal rim by means of T-headed rivets that pass therethrough and through the flange, 9, (the face portion of the socket) as indicated at points, 15, in Figs. 1, 2, 3 and 4. The remaining spokes are bored to receive T-headed bolts, 16, which at their outer ends bear clamping lugs (17) (18) and nuts (19) which are employed to secure the demountable tire rim upon the fixed rim, as well shown in Figs. 9 and 10. The demountable rims (20) (21), here shown, are of the well-known straight side type, one of the Q. D. type and the other of the transplit or Baker type, and having oppositely-faced frusto-conical circumferential ribs 22—23. When buttoned onto the wheel the rib, 22, lands upon the seat, 8, presented by the thick back flange, 7, of the fixed rim. Then the clamping lugs are applied against the conical rib, 23, and against the conical or inclined portion, 9', of the rim, 6, to secure the demountable rim rigidly upon the fixed rim, 6. Incidentally the drawing up of the clamping lugs tightens the bolts, 16, in their spokes and completes the clamping thereof in their respective rim sockets.

Attention is called to the fact that the integral half sockets of the fixed rim constitute most admirable driving connections between the rim and the spokes and have such ample bearings upon the spokes as to obviate the possibility of their wearing into the wood. It is also to be noted that the integral metal spoke sockets are lateral abutments against the spokes and are amply able to resist all axially directed thrusts and stresses that might otherwise tend to displace the fixed rim upon the spokes.

Cracking or splitting of the spokes is prevented by their abutment against one another at the wheel center and at the outer ends is prevented by the substantially complete inclosure of the spokes within their metal sockets and the correspondingly curved T-heads (see Fig. 11) of the bolts and rivets.

The end thrusts exerted upon the spokes when they are pressed onto the metal rim, and afterward the continued pressure of the strongly tensioned rim, insures a remarkable firmness and solidity in the hub portion of the wheel, a feature of great importance as regards the strength, resilience and durability of the completed wheel.

This application is predicated upon my earlier applications for patents upon semi-wood wheels being for a specific form of modification of the primary forms therein described and claimed.

Having thus described my invention, I claim as new and desire to secure by Letters Patent:—

A semi-wood wheel of the kind described characterized by a fixed rim presenting a back flange and having a radial front flange deformed into spoke sockets and felly imitating and bracing portions, the whole being made from a strip of metal that is tapered in cross section and said back flange being formed from the thick edge of the strip.

In testimony whereof I have hereunto set my hand this second day of November, 1918.

ERLE KING BAKER.